United States Patent
Ho et al.

(10) Patent No.: US 10,657,076 B2
(45) Date of Patent: May 19, 2020

(54) ELECTRONIC APPARATUS AND METHOD OF EXTENDING PERIPHERAL DEVICE

(71) Applicant: VIA Technologies, Inc., New Taipei (TW)

(72) Inventors: Kuan-Jui Ho, New Taipei (TW); Yi-Hsiang Wang, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 16/373,649

(22) Filed: Apr. 3, 2019

(65) Prior Publication Data

US 2019/0317905 A1 Oct. 17, 2019

Related U.S. Application Data

(60) Provisional application No. 62/656,985, filed on Apr. 13, 2018, provisional application No. 62/656,943, filed on Apr. 12, 2018.

(30) Foreign Application Priority Data

Feb. 18, 2019 (TW) .............................. 108105259 A

(51) Int. Cl.
| | |
|---|---|
| *G06F 13/12* | (2006.01) |
| *G06F 13/42* | (2006.01) |
| *G06F 9/50* | (2006.01) |
| *G06F 13/40* | (2006.01) |

(52) U.S. Cl.
CPC .......... *G06F 13/126* (2013.01); *G06F 9/5011* (2013.01); *G06F 13/4022* (2013.01); *G06F 13/4221* (2013.01); *G06F 2213/0026* (2013.01)

(58) Field of Classification Search
CPC .. G06F 13/126; G06F 13/4221; G06F 9/5011; G06F 13/4022; G06F 2213/0026
See application file for complete search history.

(56) References Cited

U.S. PATENT DOCUMENTS

2015/0058517 A1* 2/2015 Jacobson ............... G06F 13/385
710/316

* cited by examiner

*Primary Examiner* — Ernest Unelus
*Assistant Examiner* — Ronald T Modo
(74) *Attorney, Agent, or Firm* — JCIPRNET

(57) ABSTRACT

An electronic apparatus and a method of extending peripheral devices are provided. The electronic apparatus includes: a controller; and a plurality of peripheral devices electrically connected to the controller, wherein the plurality of peripheral devices include a plurality of video graphics array display cards, wherein in an initialization phase of the electronic apparatus, the controller allocates input/output resources to a first portion of the video graphics array display cards and does not allocate the input/output resources to a second portion of the video graphics array display cards, wherein the first portion of the video graphics array display cards allocated with the input/output resources is used to display an image in the initialization phase.

22 Claims, 6 Drawing Sheets

ELECTRONIC APPARATUS AND METHOD OF EXTENDING PERIPHERAL DEVICE

CROSS-REFERENCE TO RELATED APPLICATION

This application claims the priority benefits of U.S. provisional application Ser. No. 62/656,943, filed on Apr. 12, 2018, U.S. provisional application Ser. No. 62/656,985, filed on Apr. 13, 2018, and Taiwan application serial no. 108105259, filed on Feb. 18, 2019. The entirety of each of the above-mentioned patent applications is hereby incorporated by reference herein and made a part of this specification.

BACKGROUND OF THE INVENTION

Field of the Invention

The disclosure relates to an electronic apparatus and a method of extending peripheral devices, and more particularly, to an electronic apparatus and a method of extending video graphics array (VGA) display cards.

Description of Related Art

In recent years, there has been a mining boom around the world, and the display cards widely used in the past are now being used as mining cards. Computing of mining is performed through display cards, so as far as mining is concerned, more display cards mean a higher mining efficiency. In other words, miners need a lot of display cards to speed up the mining. On the other hand, virtual reality (VR) also requires a large amount of hardware computing, so if the hardware computing functions of multiple display cards can be connected together, the real-time computing applications of VR can then be enhanced.

However, in the current computer systems, in theory, only up to 16 VGA display cards can be supported. In fact, there are other peripheral devices in the system to be required input/output (I/O) resources, so the system generally can only support 13 VGA display cards. For this reason, how to configure more VGA display cards in the system has become one of the issues requiring attention in the art.

SUMMARY OF THE INVENTION

The invention provides an electronic apparatus and a method of extending peripheral devices that can expand more VGA display cards without being limited by the allocation of I/O resources.

An electronic apparatus of the invention includes a controller and a plurality of peripheral devices electrically connected to the controller. The plurality of peripheral devices include a plurality of VGA display cards. In an initialization phase of the electronic apparatus, the controller allocates I/O resources to a first portion of the VGA display cards and does not allocate the I/O resources to a second portion of the VGA display cards. The first portion of the VGA display cards allocated with the I/O resources is used to display an image in the initialization phase.

A method of extending peripheral devices of the invention includes the following steps. In an initialization phase of an electronic apparatus, I/O resources are allocated to a first portion of a plurality of VGA display cards among a plurality of peripheral devices, and the I/O resources are not allocated to a second portion of the VGA display cards. The first portion of the VGA display cards allocated with the I/O resources is used to display an image in the initialization phase.

An electronic apparatus of the invention includes a controller, a chipset, and a plurality of peripheral devices. The plurality of peripheral devices includes at least one VGA display card. The controller and the peripheral devices are electrically connected to each other through the chipset. After the electronic apparatus displays an image, the chipset obtains a configuration cycle (CFG) read request for the at least one VGA display card from the controller, passes the CFG read request to the at least one VGA display card, and obtains CFG read information corresponding to the CFG read request therefrom. The chipset analyzes the CFG read information and determines whether the CFG read information includes a request for I/O resources, and when the CFG read information includes the request for the I/O resources, the chipset replaces the request for the I/O resources in the CFG read information with blank data and provides the replaced CFG read information to the controller.

A method of extending peripheral devices of the invention includes the following steps. After an electronic apparatus displays an image, a CFG read request for at least one VGA display card is obtained from a controller. The CFG read request is passed to the at least one VGA display card, and CFG read information corresponding to the CFG read request is obtained therefrom. The CFG read information is analyzed, and it is determined whether the CFG read information includes a request for I/O resources. When the CFG read information includes the request for the I/O resources, the request for the I/O resources in the CFG read information is replaced with blank data. The replaced CFG read information is provided to the controller.

Based on the above, in the electronic apparatus and the method of extending peripheral devices provided in the embodiments of the invention, the VGA display cards include the first VGA display card and the second VGA display card, and through allocating the I/O resources to the first VGA display card and not allocating the I/O resources to the second VGA display card, the number of VGA display cards in the electronic apparatus can be expanded without being limited to the I/O resources, so that the electronic apparatus can provide higher hardware computing applications when multiple VGA display cards are required (e.g., mining digital coins (also known as mining) or VR).

To make the aforementioned more comprehensible, several embodiments accompanied with drawings are described in detail as follows.

DESCRIPTION OF THE EMBODIMENTS

In a computer system, when each VGA display card claims that it needs input/output (I/O) resources, the basic input/output system (BIOS) generally allocates I/O resources to each of the VGA display cards. However, in an x86 system, the maximum I/O space is 64K bytes. Moreover, according to the PCI specification requirements, when a VGA display card claims that it needs I/O resources, if the VGA display card is configured behind the PCI to PCI bridge, the BIOS has to allocate a minimum of 4K bytes of I/O space to the device behind the PCI to PCI bridge (including the VGA display card). Therefore, in theory, the system can only support up to 16 VGA display cards, wherein each PCI to PCI bridge is connected to one VGA display card. In actual implementation, other peripheral devices in the system also need I/O resources, so the system generally can only support 13 VGA display cards.

To expand the VGA display cards with the limited I/O resources, in the invention, I/O resources are allocated to at least one VGA display card, so that the electronic apparatus can display an image in the initialization phase by using the VGA display card allocated with the I/O resources, and other VGA display cards are only allocated with memory-mapped input/output (MMIO) resources, wherein the other VGA display cards don't request the I/O resources or the I/O space is not enough to allocate the I/O resources for other VGA display cards. Accordingly, after the electronic apparatus displays the image by using the VGA display card allocated with the I/O resources, the remaining VGA display cards allocated with the MMIO resources may then be driven. Through the above method, the number of VGA display cards in the electronic apparatus can be expanded without being limited to the I/O resources, so that the electronic apparatus can provide higher hardware computing applications when multiple VGA display cards are required (e.g., mining digital coins (also known as mining) or VR).

Figure 1:
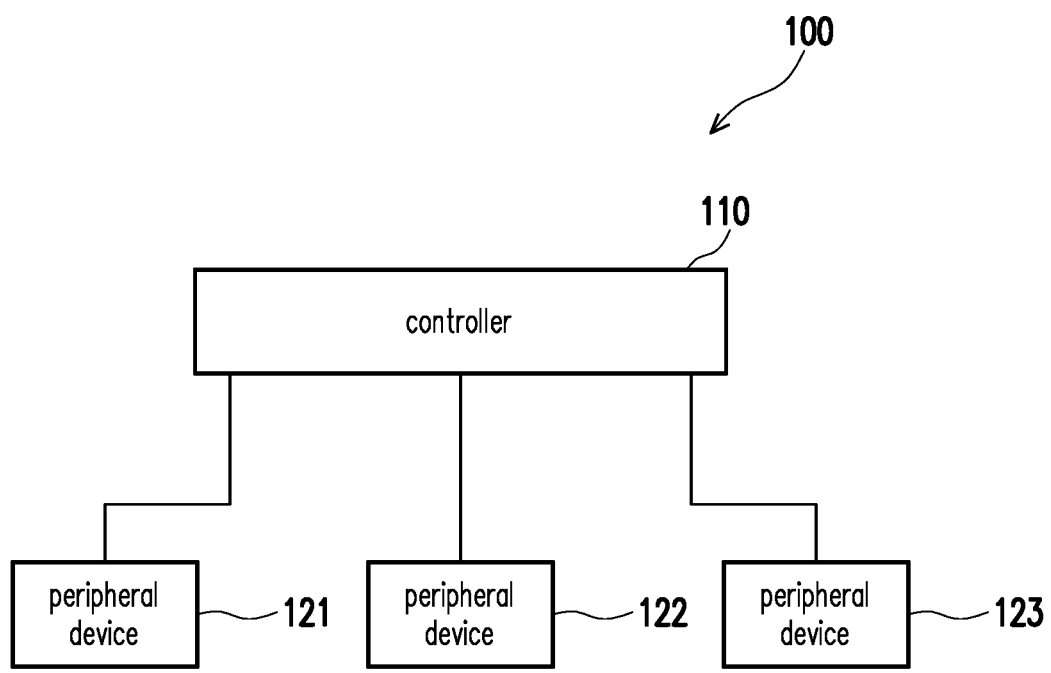
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 100 includes a controller 110 and a plurality of peripheral devices 121, 122 and 123. The electronic apparatus 100 is, for example, an apparatus that has an X86 architecture and has an expansion capability to provide a function of extending the peripheral devices, such as a desktop computer, a notebook computer, a tablet PC, etc., but the invention is not limited thereto.

For ease of illustration, the electronic apparatus 100 of the present embodiment includes a peripheral device 121, a peripheral device 122, and a peripheral device 123. However, the number of the peripheral devices is not limited herein. The peripheral device 121, the peripheral device 122, and the peripheral device 123 are electrically connected to the controller 110, and at least one of the peripheral device 121, the peripheral device 122, and the peripheral device 123 is a VGA display card. It is noted that the peripheral devices that are not VGA display cards may be, for example, a network card, a sound card, a modem, a television card, a hard disk controller, a USB, a serial port, etc., and the invention is not limited thereto.

The controller 110 controls a display image in the initialization phase of the electronic apparatus 100. The controller 110 is, for example, a central processing unit (CPU) or a BIOS, and the invention is not limited thereto.

To be able to extend the peripheral devices with the limited I/O resources, in the initialization phase of the electronic apparatus 100, the controller 110 of the present embodiment allocates I/O resources to a first portion of the plurality of VGA display cards and does not allocate I/O resources to a second portion of the plurality of VGA display cards. Specifically, the first portion of the VGA display cards of the plurality of VGA display cards may be regarded as a first VGA display card, and the second portion of the VGA display cards of the plurality of VGA display cards may be regarded as a second VGA display card. Accordingly, the electronic apparatus 100 can control the display image by using the VGA display card allocated with the I/O resources in the initialization phase and afterwards display the images of the remaining VGA display cards that are not allocated with the I/O resources, such that it can expand the number of the VGA display cards in the electronic apparatus without being limited to the hardware.

Figure 2:
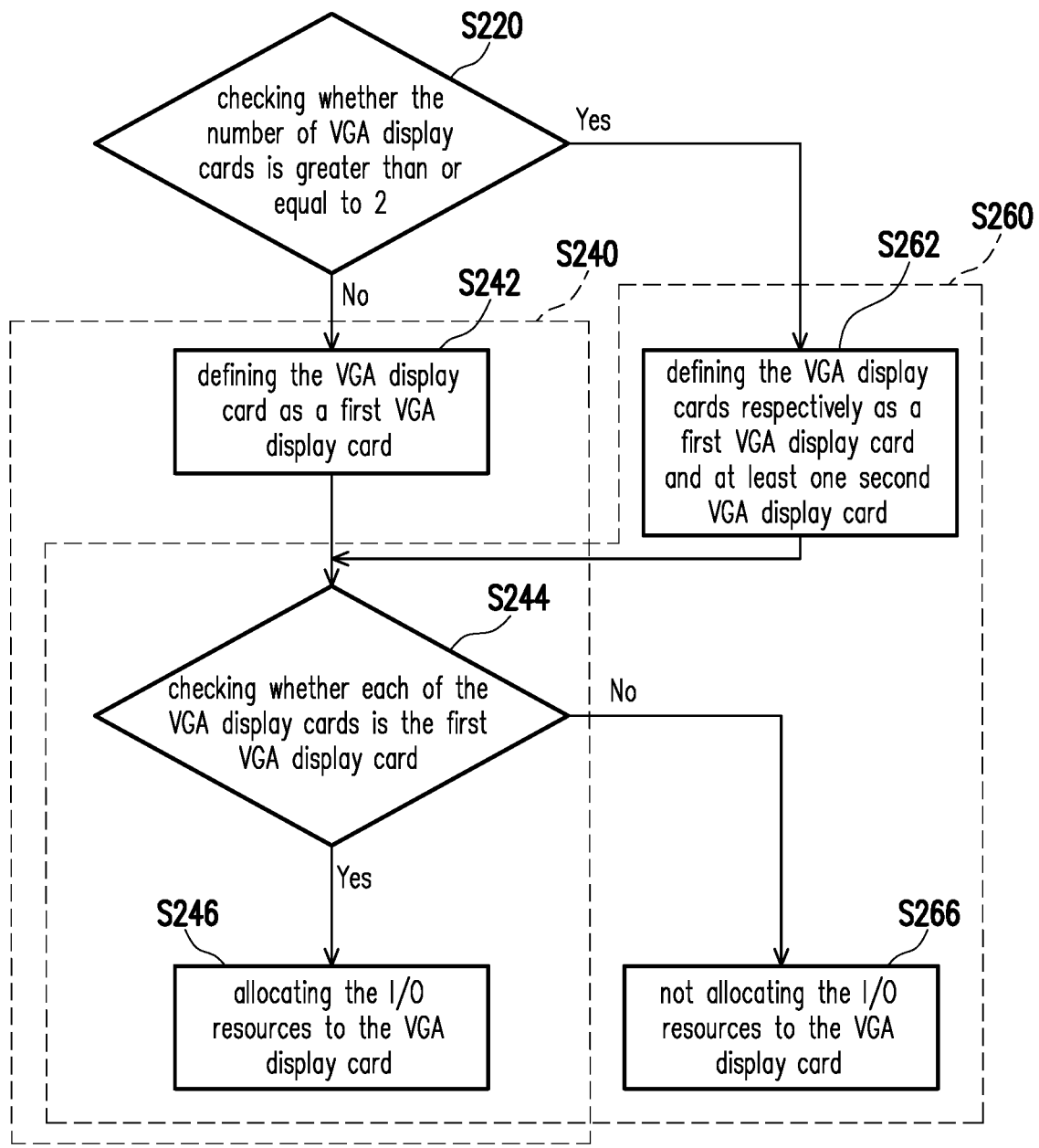
FIG. 2 is a detailed flowchart of a method of extending peripheral devices according to an embodiment of the invention.

FIG. 2 is a detailed flowchart of a method of extending peripheral devices according to an embodiment of the invention. The method of extending peripheral devices of the embodiment of FIG. 2 is applicable to the electronic apparatus 100 of the embodiment of FIG. 1. The method of extending peripheral devices of the embodiment of FIG. 2 will be described in detail below with reference to the components of the embodiment of FIG. 1.

First, the controller 110 checks the number of VGA display cards in the plurality of peripheral devices (step S220). Specifically, according to the device information (e.g., device identification, vendor identification or class code) of the configuration header of the peripheral device, the controller 110 checks whether the peripheral device is a VGA display card to thereby obtain the number of VGA display cards in the electronic apparatus 100. Afterwards, the controller 110 checks whether the number of VGA display cards is greater than or equal to 2.

In an embodiment, if the number of VGA display cards is not greater than or equal to 2 (i.e., the number is 1), the controller 110 regards the checked VGA display card as a VGA display card that needs to be allocated with the I/O resources. Namely, in the this embodiment, the plurality of VGA display cards would include a first portion and a second portion, and the checked VGA display card belongs to "the first portion of the plurality of VGA display cards" in the above description, it means the number is 1. (step S240).

Specifically, in step S240, since the number of VGA display cards is 1, the controller 110 preferentially defines the checked VGA display card as a first VGA display card (step S242). Namely, the first VGA display card belongs to "the first portion of the plurality of VGA display cards" in the above description.

After the VGA display card is defined, the controller 110 checks whether each of the VGA display cards is the first VGA display card (step S244). Specifically, assuming that the plurality of VGA display cards are defined as two or more types of VGA display cards, such as first and second VGA display cards, the controller 110 checks whether the VGA display card is the first VGA display card (i.e., the first portion of the plurality of VGA display cards) to determine whether to allocate the I/O resources to the VGA display card.

If the controller 110 checks that the VGA display card is the first VGA display card in step S244, the controller 110 allocates the I/O resources to the VGA display card (step S246). Specifically, the controller 110 allocates the I/O resources in the base address register (BAR) in the VGA display card and sets the I/O space bit in the command register to 1. Therefore, after the I/O space bit is enabled, the controller 110 can then access the I/O address space of the VGA display card.

For example, referring to FIG. 1, among the peripheral device 121, the peripheral device 122, and the peripheral device 123, only the peripheral device 121 is a VGA display card. The controller 110 then checks that the number of VGA display cards among the peripheral devices is 1, defines the peripheral device 121 as the first VGA display card, and allocates the I/O resources to the peripheral device 121.

It is noted that, in another embodiment, after the controller 110 checks that the number of VGA display cards is not greater than or equal to 2 (i.e., the number is 1), the controller 110 does not need to perform step S242 and step S244 but directly allocates the I/O resources to the VGA display card. Specifically, the method by which the controller 110 allocates the I/O resources is as described in step S246 and will not be repeatedly described herein.

In another embodiment, if the number of VGA display cards is greater than or equal to 2, the controller 110 sequentially accesses a plurality of BARs in each of the peripheral devices to obtain the resources requests of the peripheral devices to determine to allocate the I/O resources to the first portion of the plurality of VGA display cards among the peripheral devices and initialize the first portion of the VGA display cards (step S260). Specifically, the controller 110 checks whether each BAR of each of the peripheral devices needs I/O resources or MMIO resources according to the $0^{th}$ bit of each BAR of each of the peripheral devices. If the $0^{th}$ bit of the BAR is 1, the peripheral device requests I/O resources; if the $0^{th}$ bit of the BAR is 0, the peripheral device requests MMIO resources. Next, the amount of space needed for this peripheral device is obtained.

Specifically, in step S260, if the controller 110 obtains the I/O resources requests of the peripheral devices and finds that the I/O resources are needed but the I/O space is insufficient, the controller 110 defines the plurality of VGA display cards as a first VGA display card and at least one second VGA display card (step S262). In other words, the plurality of VGA display cards include the first VGA display card and the at least one second VGA display card. Particularly, the first VGA display card belongs to "the first portion of the plurality of VGA display cards" in the above description, and the at least one second VGA display card belongs to "the second portion of the plurality of VGA display cards" in the above description.

After the plurality of VGA display cards are defined, the controller 110 checks whether each of the VGA display cards is the first VGA display card (step S244). Specifically, the controller 110 sequentially checks whether each of the VGA display cards is the first VGA display card (i.e., the first portion of the plurality of VGA display cards) to determine whether to allocate the I/O resources to each of the first VGA display cards.

If the controller 110 checks that the VGA display card is the first VGA display card in step S244, the VGA display card is allocated with the I/O resources (step S246). If the controller 110 checks that the VGA display card is not the first VGA display card in step S244, the VGA display card is not allocated with the I/O resources (step S266). Specifically, the controller 110 allocates the I/O resources in the BAR of the first VGA display card and sets the I/O space bit in the command register to 1. Therefore, after the I/O space bit is enabled, the controller 110 can then access the I/O address space of the VGA display card.

It is particularly noted here that the resources allocation of the second VGA display card which are not allocated with the I/O resources is as follows. In an embodiment, the controller 110 allocates the MMIO resources in the BAR of the second VGA display card, and sets the I/O space bit in the command register to 0 and sets the memory space bit to 1. Therefore, after the memory space bit is enabled, the controller 110 can then access the MMIO address space of the VGA display card.

For example, referring to FIG. 1, among the peripheral devices 121, 122, and 123, the peripheral device 121 and the peripheral device 122 are VGA display cards. The controller 110 then checks that the number of VGA display cards among the peripheral devices is 2, sequentially accesses the BARs in the peripheral device 121, the peripheral device 122, and the peripheral device 123 to obtain the memory resources requests of the peripheral device 121, the peripheral device 122, and the peripheral device 123, and defines the peripheral device 121 as the first VGA display card and the peripheral device 122 as the second VGA display card. Next, the controller 110 allocates the I/O resources to the peripheral device 121, initializes the peripheral device 121, and allocates the MMIO resources to the peripheral device 122.

It is noted that, in an embodiment, the controller 110 may define only one VGA display card as the first VGA display card and define all the remaining VGA display cards as the second VGA display cards. In other embodiments, the controller 110 may define multiple VGA display cards as the first VGA display cards, which nonetheless should not exceed the space of the I/O resources. For example, if there are a total of 17 VGA display cards, the controller 110 may define 13 VGA display cards (i.e., the number of VGA display cards to which the system can actually allocate the I/O resources) as the first VGA display cards and define 4 VGA display cards as the second VGA display cards.

Figure 3:
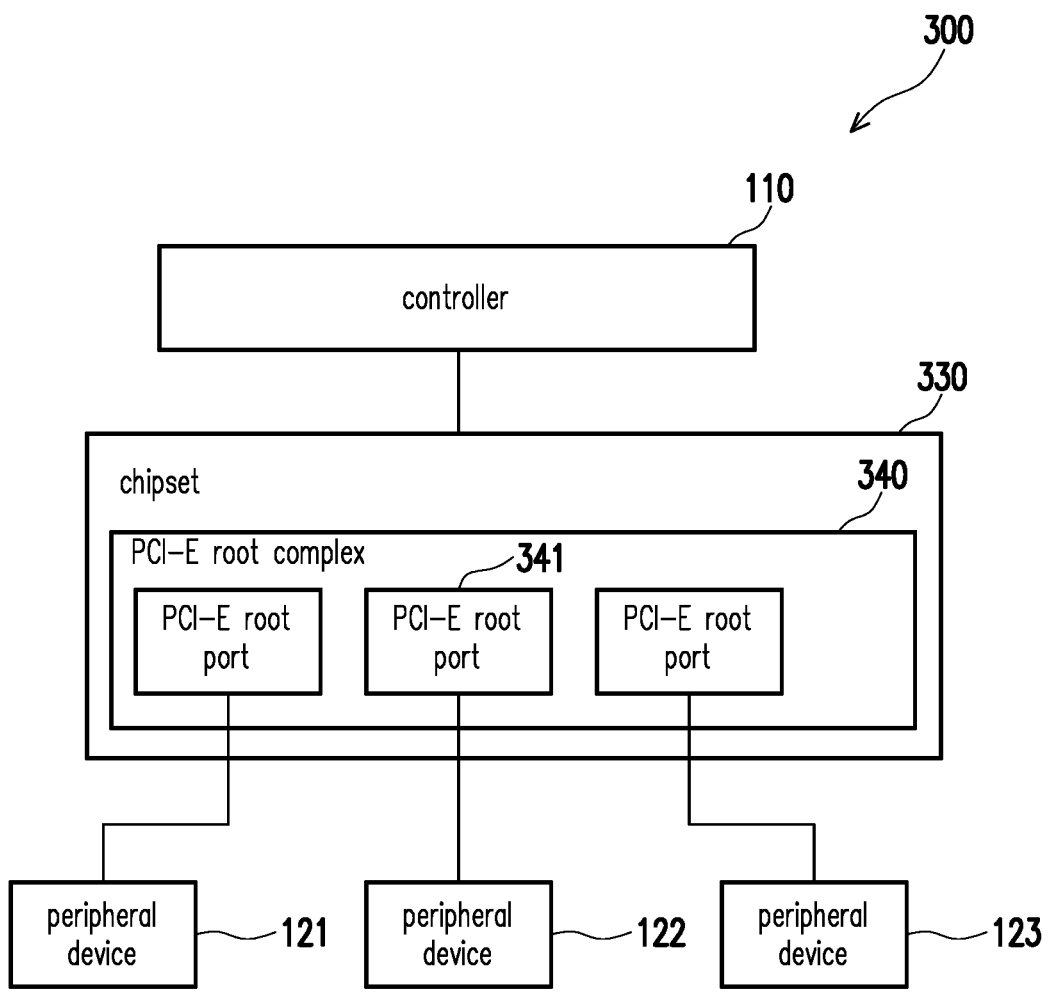
FIG. 3 is a block diagram of an electronic apparatus according to another embodiment of the invention.

FIG. 3 is a block diagram of an electronic apparatus according to another embodiment of the invention. Referring to FIG. 3, the controller 110 and the plurality of peripheral devices (the peripheral device 121, the peripheral device 122, and the peripheral device 123) in FIG. 3 are the same as the controller 110 and the plurality of peripheral devices (the peripheral device 121, the peripheral device 122, and the peripheral device 123) of FIG. 1, but the number of the peripheral devices is not limited thereto. The difference between the two lies is that an electronic apparatus 300 of FIG. 3 further includes a chipset 330, and the chipset 330 includes a PCI-E root complex 340. The PCI-E root complex 340 includes at least one PCI-E root port 341, and the controller 110 intercommunicates with the peripheral device 121, the peripheral device 122, and the peripheral device 123 through the corresponding PCI-E root ports 341.

In the present embodiment, assuming that when the mining mode or the VR mode cannot be enabled, and at this time, the second VGA display card (the second portion of the VGA display cards) which is not allocated with the I/O resources haven't been enabled, the chipset 330 performs the following operations on the second VGA display card for enabling. For ease of illustration, in the present embodiment, the peripheral device 121 is classified as the second VGA display card which is not allocated with the I/O resources.

Figure 4:
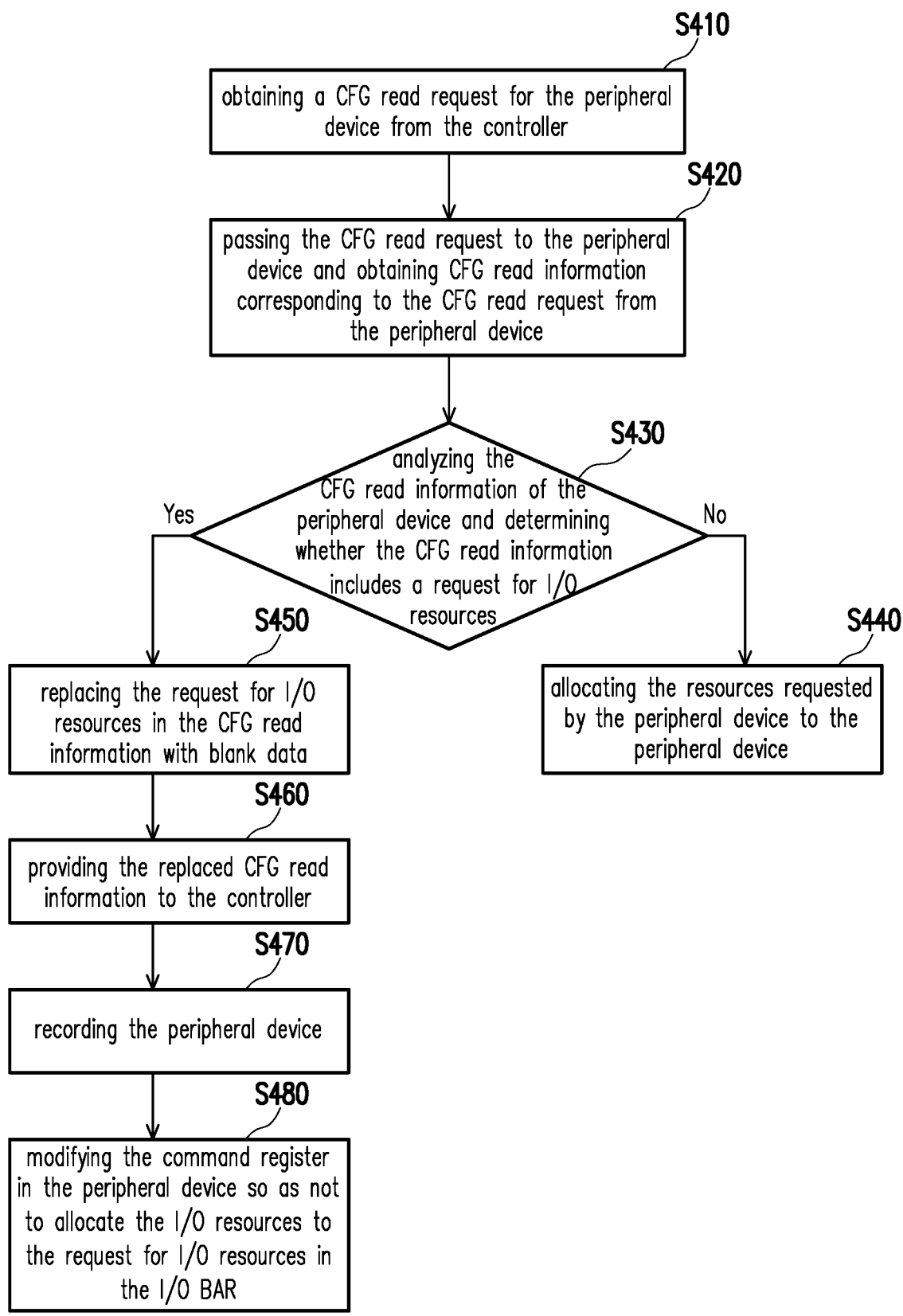
FIG. 4 is a detailed flowchart of a method of extending peripheral devices according to another embodiment of the invention.

FIG. 4 is a detailed flowchart of a method of extending peripheral devices according to another embodiment of the invention. The method of extending peripheral devices of the embodiment of FIG. 4 is applicable to the electronic apparatus 300 of the embodiment of FIG. 3. The method of extending peripheral devices of the embodiment of FIG. 4 will be described in detail below with reference to the components of the embodiment of FIG. 3.

First, the chipset 330 obtains a configuration cycle (CFG) read request for the peripheral device 121 from the controller 110 (step S410).

Next, the chipset 330 passes the CFG read request to the peripheral device 121 and obtains CFG read information corresponding to the CFG read request from the peripheral device 121 (step S420). Specifically, the chipset 330 passes the CFG read request to the peripheral device 121 and obtains CFG read data corresponding to the CFG read request from the peripheral device 121 through the PCI-E root port 341.

Then, the chipset 330 analyzes the CFG read information of the peripheral device 121 and determines whether the CFG read information includes a request for I/O resources (step S430). Specifically, the chipset 330 obtains the information in the CFG read addresses offset 0x10 to 0x27 of the peripheral device 121 (i.e., the information of the BAR). If a BAR having bit 0 and bit 1 respectively being 1 and 0 is present in the CFG read addresses offset 0x10 to 0x27, it means that the peripheral device 121 has a request for I/O resources. Conversely, if a BAR having bit 0 being 0 is present in the CFG read addresses offset 0x10 to 0x27, it means that the peripheral device 121 has a request for MMIO resources.

If the chipset 330 determines that the CFG read information does not include a request for I/O resources in step S430, the resources (not I/O resources) requested by the peripheral device 121 are allocated to the peripheral device 121 (step S440). Specifically, if the peripheral device 121 requests the MMIO resources, the chipset 330 allocates the MMIO resources to the peripheral device 121.

If the chipset 330 determines that the CFG read information includes a request for I/O resources in step S430, the request for I/O resources in the CFG read information is replaced with blank data (step S450). Specifically, the chipset 330 replaces the request for I/O resources in the CFG read addresses offset 0x10 to 0x27 with "0x00000000".

Finally, the chipset 330 provides the replaced CFG read information to the controller 110 (step S460). Specifically, the controller 110 reads the replaced CFG read data, so that the chipset 330 can hide the request for I/O resources of the peripheral device 121 from the controller 110, but the chipset 330 cannot affect the request for MMIO resources of the peripheral device 121. Therefore, the controller 110 can thereby allocate the MMIO resources to the peripheral device 121. It is noted that the conventional chipset does not hide the request for I/O resources of the peripheral device from the controller, but in the present embodiment, since the chipset can replace the request for I/O resources in the CFG read information with blank data, the request for I/O resources of the peripheral device can be hidden.

In an embodiment, after the chipset 330 provides the replaced CFG read information to the controller 110, the chipset 330 further records the peripheral device 121 (step S470). Specifically, the chipset 330 records the information of the peripheral device 121 in a lookup table. The information in the lookup table includes the bus number, the device number, and the function number (Bus/Dev/Fun) of the peripheral device 121 and whether the second VGA display card (i.e., the VGA display card that is not allocated with the I/O resources) is enabled. In the present embodiment, the chipset 330 records the peripheral device 121 as "enabled". For example, the information of the peripheral device 121 is as shown in Table 1. When the second VGA display card is in an enabled state, it means that the peripheral device 121 is defined as a VGA display card that is not allocated with the I/O resources and can be operated in the mining mode or the VR mode.

TABLE 1

| Second VGA display card | Bus/Dev/Fun |
|---|---|
| Enabled | bus x/dev y/fun z |

Next, the chipset 330 may further modify the command register in the peripheral device 121 so as not to allocate the I/O resources to the request for I/O resources in the I/O BAR (step S480). Specifically, the chipset 330 obtains a CFG write request for the peripheral device 121 from the controller 110. If the bus information/device information/function information of the target device in the CFG write request is recorded in the lookup table, and the address of the write request is the command register, the chipset 330 records the I/O space bit of the command register in the target device as 0 and modifies the command register in the peripheral device 121.

It is noted that, in an embodiment, the above replaced operations (e.g., step S450) performed by the chipset 330 may be performed by the PCI-E root port 341 in the PCI-E root complex 340 of the chipset 330. Therefore, as can be seen from the above embodiment and the corresponding FIG. 3 and FIG. 4, although the chipset 330 determines that the CFG read information includes the request for I/O resources, the PCI-E root complex 340 replaces the request for I/O resources in the CFG read information with blank data, so that the chipset 330 does not allocate the I/O resources to the corresponding peripheral device 121. As a result, the use of I/O resources can be reduced to solve the limitation of I/O usage space.

Figure 5:
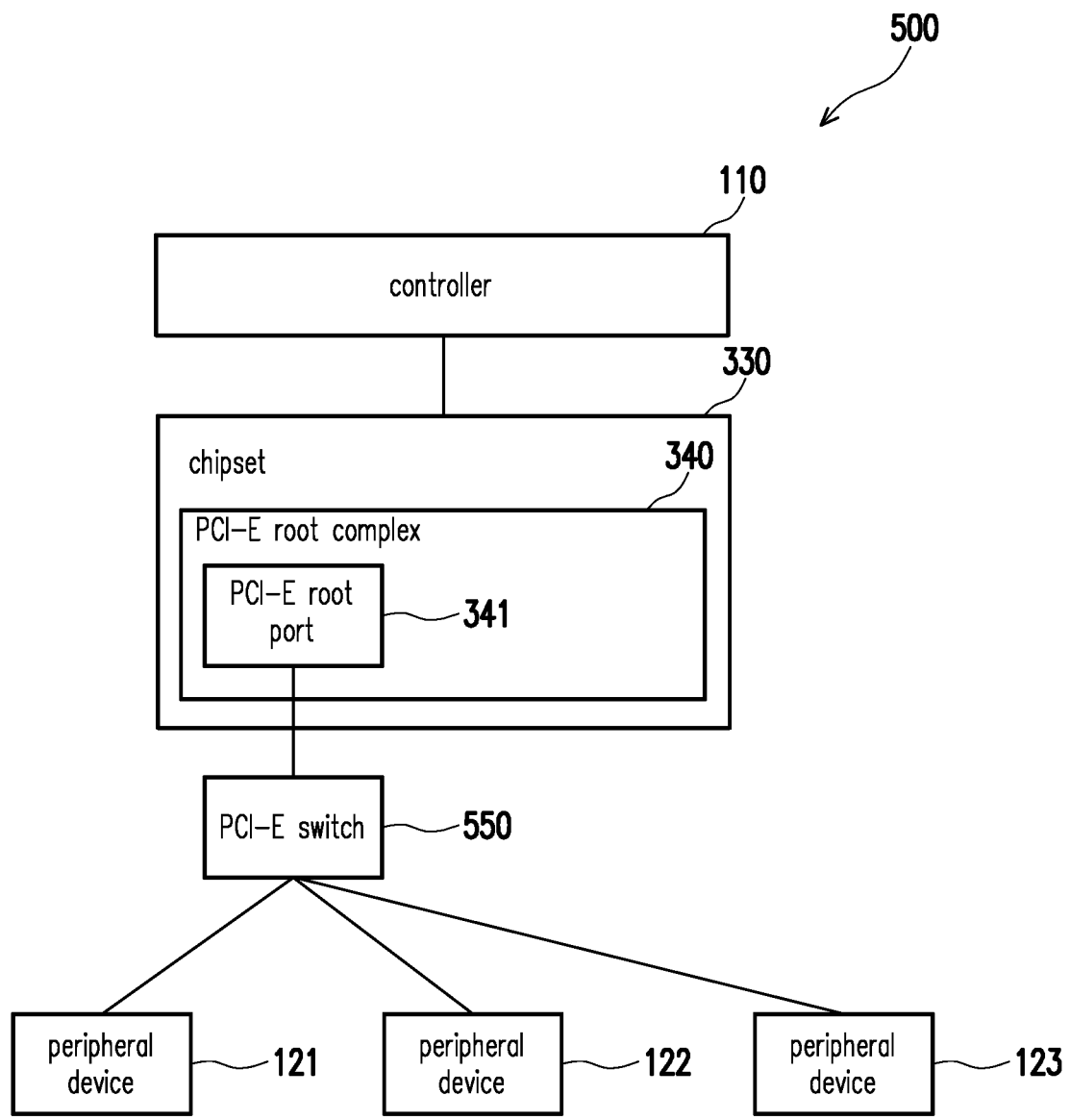
FIG. 5 is a block diagram of an electronic apparatus according to another embodiment of the invention.

FIG. 5 is a block diagram of an electronic apparatus according to another embodiment of the invention. Referring to FIG. 5, the controller 110, the plurality of peripheral devices (the peripheral device 121, the peripheral device 122, and the peripheral device 123), and the chipset 330 in FIG. 5 are the same as the controller 110, the plurality of peripheral devices (the peripheral device 121, the peripheral device 122, and the peripheral device 123), and the chipset 330 of FIG. 3, but the number of the peripheral devices is not limited thereto. The difference between the two lies in that an electronic apparatus 500 of FIG. 5 further includes at least one PCI-E switch 550. Particularly, the PCI-E switch may be regarded as a peripheral device.

For ease of illustration, the electronic apparatus 500 of the present embodiment includes the PCI-E switch 550, but the number of PCI-E switches is not limited thereto. The PCI-E switch 550 is electrically coupled to the PCI-E root port 341, and the number of PCI-E root port is not limited thereto. The peripheral device 121, the peripheral device 122, and the peripheral device 123 are directly electrically connected to the PCI-E switch 550. The controller 110 intercommunicates with the peripheral device 121, the peripheral device 122, and the peripheral device 123 through the PCI-E root port 341 of the PCI-E root complex 340 in the chipset 330 and the PCI-E switch 550.

In the present embodiment, assuming that when the mining mode or the VR mode cannot be enabled, and at this time, the second VGA display card (the second portion of the VGA display cards) which is not allocated with the I/O resources haven't been enabled, the chipset 330 performs the following operations on the second VGA display card for enabling. For ease of illustration, in the present embodiment, the peripheral device 121 is classified as the second VGA display card which is not allocated with the I/O resources, and the peripheral device 122 and the peripheral device 123 are not VGA display cards.

Figure 6:
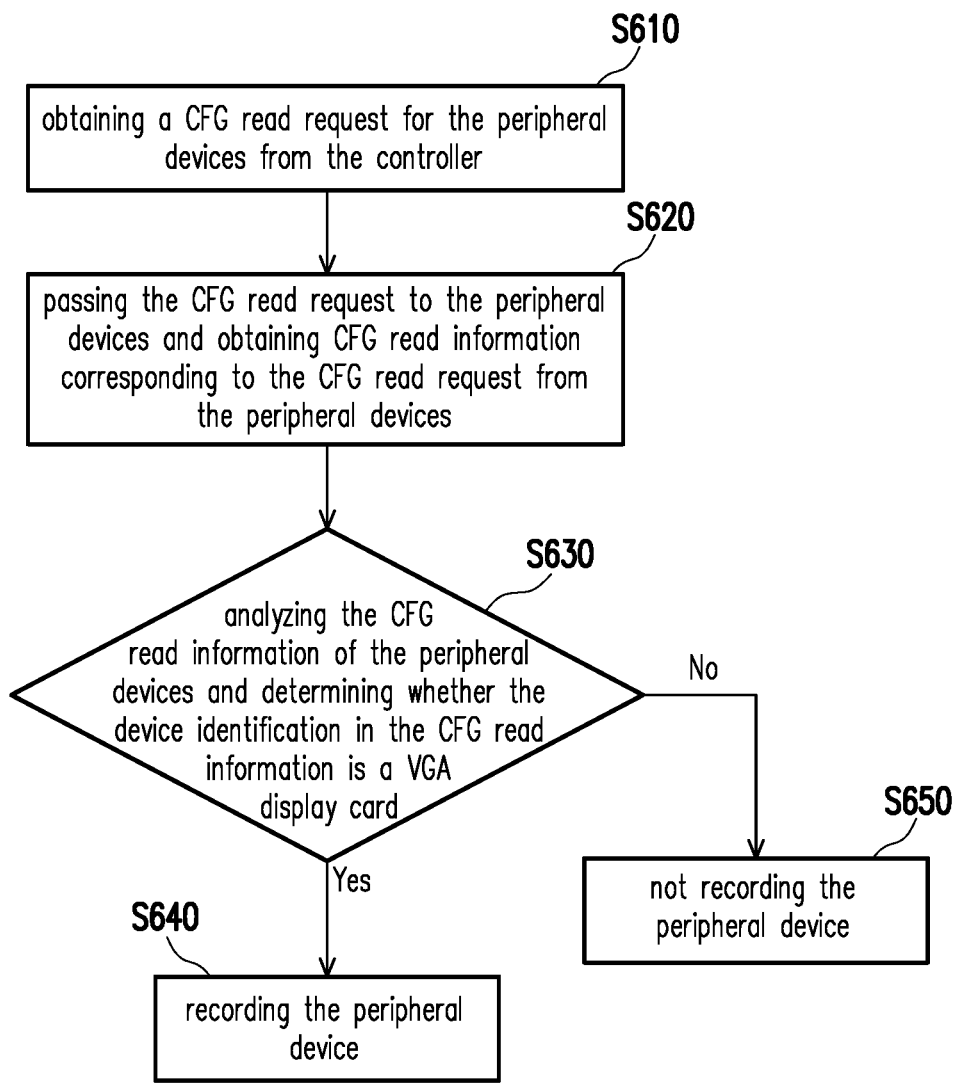
FIG. 6 is a detailed flowchart of a portion of a method of extending peripheral devices according to another embodiment of the invention.

FIG. 6 is a detailed flowchart of a portion of a method of extending peripheral devices according to another embodiment of the invention. The method of extending peripheral devices of the embodiment of FIG. 6 is applicable to the electronic apparatus 500 of the embodiment of FIG. 5. The method of extending peripheral devices of the embodiment of FIG. 6 will be described in detail below with reference to the components of the embodiment of FIG. 5. It is noted that, after performing the steps of FIG. 6, the chipset 330 of the electronic apparatus 500 continues to perform steps similar to those of FIG. 4 (e.g., steps S410 to S480).

First, the chipset 330 obtains a CFG read request for the peripheral devices from the controller 110 (step S610).

Next, the chipset 330 passes the CFG read request to the peripheral devices and obtains CFG read information corresponding to the CFG read request from the peripheral devices (step S620). Specifically, the chipset 330 passes the CFG read request to the PCI-E switch 550 through the PCI-E root port 341. Afterwards, the PCI-E switch 550 passes the CFG read request to the peripheral device 121, the peripheral device 122, and the peripheral device 123 and obtains CFG read data corresponding to the CFG read request from the peripheral device 121, the peripheral device 122, and the peripheral device 123. After the PCI-E switch 550 obtains the CFG read data corresponding to the CFG read request, the chipset 330 obtains the CFG read data corresponding to the CFG read request from the PCI-E switch 550.

Then, the chipset 330 analyzes the CFG read information of the peripheral devices and determines whether the device information (e.g., device identification, vendor identification or class code) in the CFG read information is a VGA display card (step S630). Specifically, the chipset 330 obtains the information of the CFG read address offset 0x0E (i.e., information of the configuration header) of the peripheral device 121, the peripheral device 122, the peripheral device 123, and the PCI-E switch 550. If the information of the CFG read address offset 0x0E is 0x00, it means that the peripheral device is a VGA display card. Conversely, if the information of the CFG read address offset 0x0E is not 0x00, it means that the peripheral device is not a VGA display card. For example, if the information of the CFG read address offset 0x0E is 0x01, since the information of offset 0x0E is not 0x00, it means that the peripheral device is a PCI-E switch.

If the chipset 330 determines that the peripheral device is a VGA display card in step S630, the peripheral device is recorded (step S640). If the chipset 330 determines that the peripheral device is not a VGA display card in step S630, the peripheral device is not recorded (step S650). Specifically, the chipset 330 determines that the peripheral device 121 is a VGA display card, and the chipset 330 records the information of the peripheral device 121 in a lookup table. The information in the lookup table includes the bus number, the device number, and the function number (Bus/Dev/Fun) of the peripheral device 121 and records the valid bit of the peripheral device 121 as "enabled" (which means that the peripheral device 121 is a VGA display card), as shown in the information of the first item (item 1) in Table 2, for example. In contrast, the chipset 330 determines that the peripheral device 122, the peripheral device 123, and the PCI-E switch 550 are not VGA display cards and does not record the peripheral device 122, the peripheral device 123, and the PCI-E switch 550 in the lookup table.

TABLE 2

| Item | Valid bit | Bus/Dev/Fun |
|---|---|---|
| 1 | Enabled | bus x/dev y/fun z |
| 2 | Disabled | |
| 3 | Disabled | |

After this lookup table is completed, since the lookup table includes an enabled VGA display card (for example, the peripheral device 121 is a VGA display card), the chipset 330 of FIG. 5 may perform steps similar to those of FIG. 4 on the VGA display card recorded in the lookup table. Namely, similar to the chipset 330 of FIG. 3, the chipset 330 replaces the request for I/O resources in the CFG read information with blank data, so that the controller 110 does not allocate I/O resources to the peripheral device 121 which originally requests the I/O resources of FIG. 5. As a result, it is possible to reduce the use of the I/O resources or even enter the mining mode or the VR mode. It is noted that the conventional chipset does not hide the request for I/O resources of the peripheral device from the controller, but in the present embodiment, since the chipset can replace the request for I/O resources in the CFG read information with blank data, the request for I/O resources of the peripheral device can be hidden.

It is noted that, different from the above step S420, in step S620 of the present embodiment, the chipset 330 passes the CFG read request to the peripheral device 121 and obtains the CFG read data corresponding to the CFG read request from the peripheral device 121 through the PCI-E root port 341 via the PCI-E switch 550.

In another embodiment, the electronic apparatus 500 further includes a plurality of PCI-E switches that are connected to each other in series. Therefore, after learning about the peripheral environment of the electronic apparatus and recording one or more peripheral devices that are VGA display cards in the lookup table through the steps of FIG. 6, the chipset 330 may then perform the steps of FIG. 4 to allocate the I/O or MMIO resources to the VGA display cards.

In other embodiments, the method of extending peripheral devices of the embodiment of FIG. 4 is applicable to the electronic apparatus 500 of the embodiment of FIG. 5. In such embodiments, the electronic apparatus 500 performs the method of extending peripheral devices of FIG. 4 through the PCI-E switch 550.

In summary of the above, in the electronic apparatus and the method of extending peripheral devices provided in the embodiments of the invention, the VGA display cards include the first VGA display card and the second VGA display card, and through software operation, the controller can allocate the I/O resources to the first VGA display card and does not allocate the I/O resources to the second VGA display card. Therefore, the electronic apparatus can display an image by using the first VGA display card allocated with the I/O resources in the initialization phase, and afterwards display an image of the remaining second VGA display card which is not allocated with the I/O resources. Accordingly, the number of VGA display cards in the electronic apparatus can be expanded without being limited to the I/O resources, so that the electronic apparatus can provide higher hardware computing applications when multiple VGA display cards are required (e.g., mining digital coins (also known as mining) or VR).

On the other hand, through hardware operations (e.g., the chipset 330 of FIG. 3 and FIG. 5), it is also possible to determine whether the CFG read information includes a request for I/O resources and whether to replace the request for I/O resources in the CFG read information with blank data to thereby hide the request for I/O resources of the peripheral device and provide higher computing applications.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus comprising:
   a controller; and
   a plurality of peripheral devices electrically connected to the controller, wherein the plurality of peripheral devices comprise a plurality of video graphics array (VGA) display cards,
   wherein in an initialization phase of the electronic apparatus, the controller allocates input/output (I/O) resources to a first portion of the VGA display cards and does not allocate the I/O resources to a second portion of the VGA display cards,
   wherein the first portion of the VGA display cards allocated with the I/O resources is used to display an image in the initialization phase.

2. The electronic apparatus according to claim 1, wherein in the initialization phase, the controller further checks a number of the VGA display cards among the plurality of peripheral devices, and
   when the number of the VGA display cards is not greater than or equal to 2, the controller regards the checked VGA display card as the first portion of the VGA display cards and allocates the I/O resources.

3. The electronic apparatus according to claim 1, wherein in the initialization phase, the controller further checks a number of the VGA display cards among the plurality of peripheral devices, and
   when the number of the VGA display cards is greater than or equal to 2, the controller sequentially accesses a base address register in each of the peripheral devices to obtain memory resources requests of the plurality of peripheral devices to determine to allocate the I/O resources to the first portion of the VGA display cards among the plurality of peripheral devices and initialize the first portion of the VGA display cards.

4. The electronic apparatus according to claim 1, wherein the VGA display cards comprise a first VGA display card and at least one second VGA display card, wherein the first VGA display card belongs to the first portion of the VGA display cards, and the at least one second VGA display card belongs to the second portion of the VGA display cards.

5. The electronic apparatus according to claim 1, wherein the controller is a central processing unit or a basic input/output system.

6. The electronic apparatus according to claim 1, further comprising:
   a chipset, wherein the controller and the peripheral devices are electrically connected to each other through the chipset,
   wherein when the controller does not allocate the I/O resources to the second portion of the VGA display cards, the chipset performs operations below:
   obtaining a configuration cycle (CFG) read request for the second portion of the VGA display cards from the controller;
   passing the CFG read request to the second portion of the VGA display cards and obtaining CFG read information corresponding to the CFG read request therefrom;
   analyzing the CFG read information and determining whether the CFG read information comprises a request for the I/O resources;
   when the CFG read information comprises the request for the I/O resources, replacing the request for the I/O resources in the CFG read information with blank data; and
   providing the replaced CFG read information to the controller.

7. The electronic apparatus according to claim 6, wherein the chipset further records the second portion of the VGA display cards and modifies base address registers in the second portion of the VGA display cards so as not to allocate the I/O resources to the request for the I/O resources.

8. The electronic apparatus according to claim 6, wherein the chipset comprises a peripheral component interconnect express (PCI-E) root complex, wherein the controller and the peripheral devices are electrically connected to each other through the PCI-E root complex.

9. The electronic apparatus according to claim 8, wherein the PCI-E root complex comprises:
   at least one PCI-E root port, wherein the plurality of peripheral devices are directly electrically connected to the at least one PCI-E root port, and the controller intercommunicates with the plurality of peripheral devices through the PCI-E root port of the PCI-E root complex in the chipset.

10. The electronic apparatus according to claim 8, wherein the PCI-E root complex comprises a PCI-E root port, and the electronic apparatus further comprises at least one PCI-E switch, wherein the at least one PCI-E switch is electrically coupled to the PCI-E root port, wherein the plurality of peripheral devices are directly electrically connected to the at least one PCI-E switch, and the controller intercommunicates with the plurality of peripheral devices through the PCI-E root port of the PCI-E root complex in the chipset and the at least one PCI-E switch.

11. A method of extending peripheral devices, comprising:
   in an initialization phase of an electronic apparatus, allocating I/O resources to a first portion of a plurality of VGA display cards among a plurality of peripheral devices, and not allocating the I/O resources to a second portion of the VGA display cards,
   wherein the first portion of the VGA display cards allocated with the I/O resources is used to display an image in the initialization phase.

12. The method according to claim 11, wherein in the initialization phase, the method comprises further checking a number of the VGA display cards among the plurality of peripheral devices, and
   when the number of the VGA display cards is not greater than or equal to 2, regarding the checked VGA display card as the first portion of the VGA display cards and allocating the I/O resources.

13. The method according to claim 11, wherein in the initialization phase, the method comprises further checking a number of the VGA display cards among the plurality of peripheral devices, and
   when the number of the VGA display cards is greater than or equal to 2, sequentially accessing a base address register in each of the peripheral devices to obtain memory resources requests of the plurality of peripheral devices to determine to allocate the I/O resources to the first portion of the VGA display cards among the plurality of peripheral devices and initialize the first portion of the VGA display cards.

14. The method according to claim 11, wherein the VGA display cards comprise a first VGA display card and at least one second VGA display card, wherein the first VGA display card belongs to the first portion of the VGA display cards, and the at least one second VGA display card belongs to the second portion of the VGA display cards.

15. The method according to claim 11, further comprising:
when the I/O resources are not allocated to the second portion of the VGA display cards,
obtaining a CFG read request for the second portion of the VGA display cards from a controller;
passing the CFG read request to the second portion of the VGA display cards and obtaining CFG read information corresponding to the CFG read request therefrom;
analyzing the CFG read information and determining whether the CFG read information comprises a request for the I/O resources;
when the CFG read information comprises the request for the I/O resources, replacing the request for the I/O resources in the CFG read information with blank data; and
providing the replaced CFG read information to the controller.

16. The method according to claim 15, further comprising recording the second portion of the VGA display cards and modifying base address registers in the second portion of the VGA display cards so as not to allocate the I/O resources to the request for the I/O resources.

17. An electronic apparatus comprising:
a controller;
a chipset; and
a plurality of peripheral devices, comprising at least one VGA display card,
wherein the controller and the peripheral devices are electrically connected to each other through the chipset, and after the electronic apparatus displays an image, the chipset obtains a CFG read request for the at least one VGA display card from the controller, passes the CFG read request to the at least one VGA display card, and obtains CFG read information corresponding to the CFG read request therefrom, wherein the chipset analyzes the CFG read information and determines whether the CFG read information comprises a request for I/O resources, and when the CFG read information comprises the request for the I/O resources, the chipset replaces the request for the I/O resources in the CFG read information with blank data and provides the replaced CFG read information to the controller.

18. The electronic apparatus according to claim 17, wherein the chipset comprises a PCI-E root complex, wherein the controller and the peripheral devices are electrically connected to each other through the PCI-E root complex.

19. The electronic apparatus according to claim 18, wherein the PCI-E root complex comprises:
at least one PCI-E root port, wherein the plurality of peripheral devices are directly electrically connected to the at least one PCI-E root port, and the controller intercommunicates with the plurality of peripheral devices through the PCI-E root port of the PCI-E root complex in the chipset.

20. The electronic apparatus according to claim 18, wherein the PCI-E root complex comprises a PCI-E root port, and the electronic apparatus further comprises at least one PCI-E switch, wherein the at least one PCI-E switch is electrically coupled to the PCI-E root port, wherein the plurality of peripheral devices are directly electrically connected to the at least one PCI-E switch, and the controller intercommunicates with the plurality of peripheral devices through the PCI-E root port of the PCI-E root complex in the chipset and the at least one PCI-E switch.

21. A method of extending peripheral devices, comprising:
after an electronic apparatus displays an image, obtaining a CFG read request for at least one VGA display card from a controller;
passing the CFG read request to the at least one VGA display card and obtaining CFG read information corresponding to the CFG read request therefrom;
analyzing the CFG read information and determining whether the CFG read information comprises a request for I/O resources;
when the CFG read information comprises the request for the I/O resources, replacing the request for the I/O resources in the CFG read information with blank data; and
providing the replaced CFG read information to the controller.

22. The method according to claim 21, further comprising recording the at least one VGA display card and modifying a base address register in the at least one VGA display card so as not to allocate the I/O resources to the request for the I/O resources.

* * * * *